(12) United States Patent
Kedem

(10) Patent No.: US 8,533,847 B2
(45) Date of Patent: Sep. 10, 2013

(54) APPARATUS AND METHOD FOR SCREENING NEW DATA WITHOUT IMPACTING DOWNLOAD SPEED

(75) Inventor: Noam Kedem, Foster City, CA (US)

(73) Assignee: SanDisk IL Ltd., Kfar Saba (IL)

( * ) Notice: Subject to any disclaimer, the term of this patent is extended or adjusted under 35 U.S.C. 154(b) by 1309 days.

(21) Appl. No.: 12/020,553

(22) Filed: Jan. 27, 2008

(65) Prior Publication Data

US 2008/0295179 A1 Nov. 27, 2008

Related U.S. Application Data

(60) Provisional application No. 60/939,861, filed on May 24, 2007.

(51) Int. Cl.
*G06F 7/04* (2006.01)
(52) U.S. Cl.
USPC .............. 726/26; 726/22; 726/23; 726/24; 726/27; 709/246; 709/201; 713/300; 713/166; 713/167
(58) Field of Classification Search
USPC .............. 726/22–26; 713/161, 169, 177
See application file for complete search history.

(56) References Cited

U.S. PATENT DOCUMENTS

| | | | |
|---|---|---|---|
| 5,754,939 A | 5/1998 | Herz et al. | |
| 5,790,886 A | 8/1998 | Allen | |
| 6,134,584 A | 10/2000 | Chang et al. | |
| 6,138,158 A | 10/2000 | Boyle et al. | |
| 6,145,068 A * | 11/2000 | Lewis ........................... 711/170 |
| 6,185,625 B1 | 2/2001 | Tso et al. | |
| 6,217,752 B1 | 4/2001 | Coots | |
| 6,366,912 B1 | 4/2002 | Wallent et al. | |
| 6,453,383 B1 | 9/2002 | Stoddard et al. | |
| 6,542,964 B1 | 4/2003 | Scharber | |
| 6,542,967 B1 | 4/2003 | Major | |
| 6,742,033 B1 | 5/2004 | Smith et al. | |

(Continued)

FOREIGN PATENT DOCUMENTS

| | | |
|---|---|---|
| CN | 101375579 | 9/2009 |
| EP | 0866590 | 8/1998 |

(Continued)

OTHER PUBLICATIONS

Tansel Ozyer, Intrusion detection: a novel approach, Apr. 2005, SPIE, vol. 5812, pp. 1-10.*

(Continued)

*Primary Examiner* — Nathan Flynn
*Assistant Examiner* — Viral Lakhia
(74) *Attorney, Agent, or Firm* — Brinks Hofer Gilson & Lione

(57) ABSTRACT

Data to be screened for undesired content can be quickly downloaded into a non-volatile storage of a system, stored in a manner so as to be unavailable to the system for general use, and then screened later at a convenient time regardless of whether the data source is still available. At the time of screening, a screening module retrieves the data objects stored in the non-volatile storage and indicates whether they comply with screening criteria. Data objects not complying with the screening criteria are either deleted or otherwise made unavailable for general use by the system. By retaining the data objects that do not comply with the screening criteria, the downloaded content remains available for a different system having less restrictive or otherwise different screening criteria.

37 Claims, 5 Drawing Sheets

(56) References Cited

U.S. PATENT DOCUMENTS

| | | | |
|---|---|---|---|
| 6,917,960 | B1 | 7/2005 | Decasper et al. |
| 6,937,813 | B1 | 8/2005 | Wilson |
| 6,996,676 | B2 | 2/2006 | Megiddo et al. |
| 7,043,506 | B1* | 5/2006 | Horvitz ............... 707/661 |
| 7,043,524 | B2 | 5/2006 | Shah et al. |
| 7,103,598 | B1 | 9/2006 | Clement |
| 7,155,519 | B2 | 12/2006 | Lo et al. |
| 7,167,840 | B1 | 1/2007 | Seidman et al. |
| 7,246,139 | B2* | 7/2007 | Andoh .................... 707/823 |
| 7,248,861 | B2 | 7/2007 | Lazaridis et al. |
| 7,269,851 | B2* | 9/2007 | Ackroyd ................... 726/24 |
| 7,289,563 | B2 | 10/2007 | Yamamoto |
| 7,305,473 | B2 | 12/2007 | Vogt |
| 7,317,907 | B2 | 1/2008 | Linkert et al. |
| 7,356,591 | B2 | 4/2008 | Mousseau et al. |
| 7,395,048 | B2 | 7/2008 | Kotzin |
| 7,428,540 | B1 | 9/2008 | Coates et al. |
| 7,430,633 | B2 | 9/2008 | Church et al. |
| 7,472,247 | B2 | 12/2008 | Vitanov et al. |
| 7,483,871 | B2 | 1/2009 | Herz |
| 7,512,666 | B2 | 3/2009 | Zhou |
| 7,525,570 | B2 | 4/2009 | Kiely |
| 7,549,164 | B2* | 6/2009 | Cook et al. ............... 726/22 |
| 7,574,580 | B2 | 8/2009 | Mahashin et al. |
| 7,650,630 | B2* | 1/2010 | Yamada et al. ............. 726/4 |
| 7,689,805 | B2 | 3/2010 | Moore et al. |
| 7,975,305 | B2* | 7/2011 | Rubin et al. .............. 726/25 |
| 8,037,527 | B2* | 10/2011 | Milener et al. ............ 726/22 |
| 8,151,329 | B2* | 4/2012 | Dutta et al. ................ 726/5 |
| 8,176,563 | B2* | 5/2012 | Redlich et al. ........... 726/27 |
| 2002/0165825 | A1 | 11/2002 | Matsushima et al. |
| 2003/0009538 | A1 | 1/2003 | Shah et al. |
| 2003/0114138 | A1 | 6/2003 | Ramaswamy et al. |
| 2003/0157930 | A1 | 8/2003 | Morota et al. |
| 2003/0182449 | A1* | 9/2003 | Anderson et al. .......... 709/245 |
| 2003/0187960 | A1 | 10/2003 | Koba et al. |
| 2003/0189589 | A1 | 10/2003 | LeBlanc et al. |
| 2004/0221018 | A1 | 11/2004 | Ji |
| 2004/0221118 | A1 | 11/2004 | Slater et al. |
| 2005/0039177 | A1 | 2/2005 | Burke |
| 2005/0076063 | A1 | 4/2005 | Andoh |
| 2005/0102291 | A1* | 5/2005 | Czuchry et al. ............ 707/10 |
| 2005/0132286 | A1 | 6/2005 | Rohrabaugh et al. |
| 2005/0246543 | A1 | 11/2005 | Ezaki et al. |
| 2005/0273514 | A1 | 12/2005 | Milkey et al. |
| 2006/0008256 | A1 | 1/2006 | Khedouri et al. |
| 2006/0010154 | A1* | 1/2006 | Prahlad et al. ............ 707/102 |
| 2006/0021032 | A1 | 1/2006 | Challener et al. |
| 2006/0064555 | A1 | 3/2006 | Prahlad et al. |
| 2006/0075068 | A1 | 4/2006 | Kasriel et al. |
| 2006/0075424 | A1 | 4/2006 | Talstra et al. |
| 2006/0107062 | A1 | 5/2006 | Fauthoux |
| 2006/0161604 | A1 | 7/2006 | Lobo |
| 2006/0161960 | A1 | 7/2006 | Benoit |
| 2006/0168123 | A1 | 7/2006 | Krstulich |
| 2006/0168129 | A1 | 7/2006 | Van Geest et al. |
| 2006/0200503 | A1 | 9/2006 | Dosa et al. |
| 2006/0218304 | A1 | 9/2006 | Mukherjee et al. |
| 2006/0218347 | A1 | 9/2006 | Oshima |
| 2006/0256012 | A1 | 11/2006 | Fok et al. |
| 2006/0282886 | A1* | 12/2006 | Gaug ......................... 726/5 |
| 2006/0294223 | A1 | 12/2006 | Glasgow et al. |
| 2007/0088659 | A1 | 4/2007 | Phillips |
| 2007/0157217 | A1 | 7/2007 | Jacobs et al. |
| 2007/0162972 | A1* | 7/2007 | Tan et al. ................. 726/22 |
| 2007/0165933 | A1 | 7/2007 | Thomas et al. |
| 2007/0179854 | A1 | 8/2007 | Ziv et al. |
| 2007/0185899 | A1 | 8/2007 | Ziv et al. |
| 2007/0192854 | A1* | 8/2007 | Kelley et al. ............. 726/22 |
| 2007/0198716 | A1 | 8/2007 | Knowles et al. |
| 2007/0220220 | A1 | 9/2007 | Ziv et al. |
| 2007/0276949 | A1 | 11/2007 | Mergi et al. |
| 2008/0005459 | A1 | 1/2008 | Norman |
| 2008/0005657 | A1 | 1/2008 | Sneh |
| 2008/0010372 | A1 | 1/2008 | Khedouri et al. |
| 2008/0068998 | A1 | 3/2008 | Jaggi et al. |
| 2008/0082736 | A1 | 4/2008 | Chow et al. |
| 2008/0091878 | A1 | 4/2008 | Stern et al. |
| 2008/0098093 | A1 | 4/2008 | Simon et al. |
| 2008/0127355 | A1* | 5/2008 | Lorch et al. ............... 726/29 |
| 2008/0177935 | A1 | 7/2008 | Lasser et al. |
| 2008/0189796 | A1* | 8/2008 | Linn et al. ................ 726/30 |
| 2008/0201754 | A1 | 8/2008 | Arling |
| 2008/0235520 | A1* | 9/2008 | Becker et al. ............ 713/189 |
| 2008/0243955 | A1* | 10/2008 | Anderson et al. ........ 707/204 |
| 2008/0244074 | A1* | 10/2008 | Baccas et al. ............ 709/227 |
| 2008/0244201 | A1 | 10/2008 | Heintel et al. |
| 2008/0263113 | A1* | 10/2008 | Krishnaiyer et al. ...... 707/205 |
| 2009/0089366 | A1 | 4/2009 | Toth |
| 2009/0210631 | A1 | 8/2009 | Bosworth et al. |
| 2009/0222117 | A1 | 9/2009 | Kaplan et al. |
| 2009/0327712 | A1 | 12/2009 | Sarig |
| 2010/0030963 | A1 | 2/2010 | Marcu et al. |
| 2010/0049758 | A1 | 2/2010 | Kumar |

FOREIGN PATENT DOCUMENTS

| | | |
|---|---|---|
| EP | 1211861 | 6/2002 |
| EP | 1308853 | 5/2003 |
| EP | 1445703 | 8/2004 |
| EP | 1489510 | 12/2004 |
| FR | 2793576 | 5/1999 |
| GB | 2349546 | 11/2000 |
| GB | 2350973 | 12/2000 |
| JP | 2003-216447 | 7/2003 |
| JP | 2005 169861 | 6/2005 |
| JP | 2006-134352 | 5/2006 |
| KR | 1020090012308 | 2/2009 |
| WO | WO 00/41510 | 7/2000 |
| WO | WO 02/060154 | 8/2002 |
| WO | WO 02/100117 | 12/2002 |
| WO | WO 03/021441 | 3/2003 |
| WO | WO 03/094474 | 11/2003 |
| WO | WO 2005/022942 | 3/2005 |
| WO | 2005/109302 | 11/2005 |
| WO | WO 2005/109302 A2 | 11/2005 |
| WO | WO 2007/026423 | 3/2007 |
| WO | WO 2007/044899 | 4/2007 |
| WO | WO 2007/117251 | 10/2007 |
| WO | WO 2007/138584 | 12/2007 |

OTHER PUBLICATIONS

"Android Data Caching", Process Fork, http://processfork.blogspot.com/2010/04/android-data-caching.html, Apr. 21, 2010, 2 pages.

"Cisco MDS 9000 Series Caching Services Module with IBM TotalStorage™ SAN Volume Controller Storage Software for Cisco MDS 9000", Cisco Systems, Inc., http://www.cisco.com/warp/public/cc/pd/ps4159/ps4358/prodlit/md9ds_ds.pdf, printed on Dec. 7, 2010, 9 pages.

"Persistent Caching", IBM® Cognos® 8 Virtual Manager Installation and Configuration Guide, http://publib.boulder.ibm.com/infocenter/c8bi/v8r4m0/index.jsp?topic=/com.ibm.swg.im.cognos.vvm_installation_guide.8.4.0.doc/vvm_installation_guide_id1555PersistentCaching.html, Nov. 27, 2009, 1 page.

International Search Report and Written Opinio for PCT Patent Application Serial No. PCT/US2010/026596, dated Jul. 29, 2010, 15 pages.

International Search Report and Written Opinion for PCT Patent Application Serial No. PCT/US2009/065456, dated Apr. 9, 2010, 11 pages.

The International Search Report and Written Opinion for PCT Patent Application Serial No. PCT/US2009/065056, dated Jul. 29, 2010, 35 pages.

Cache Management for the IBM Virtual Taper Server, http://www-03.ibm.com/support/techdocs/atsmastr.nsf/WebIndex/FLASH10054, printed on Jan. 3, 2011, 5 pages.

International Search Report and Written Opinion dated May 7, 2008 for PCT Application Serial No. PCT/IL2008/000126, 12 pages.

International Search Report and Written Opinion dated Oct. 26, 2009 for PCT Application Serial No. PCT/IL2009/000752, 11 pages.

Jiang, Zhimei et al., "Web Prefetching in a Mobile Environment", IEEE Personal Communications, IEEE Communications Society, US, vol. 5, No. 5, Oct. 1998, pp. 25-34.

O'Hare, Gregory et al., "Addressing Mobile HCI Needs Through Agents", Proceedings of the 4th International Symposium on Human Computer Interaction with Mobile Devices and Services (MobileHCI'02), Pisa, Italy, 2002, pp. 311-314. Spinger Verlag LNCS 2411.

Rekkedal, S., "Caching of Interactive Branching Video in MPEG-4—Thesis for the Candidatus Scientiarum Degree", *University of Oslo Department of Informatics*, Jul. 12, 2004, 140 pages.

Xiang et al., "Cost-Based Replacement Policy for Multimedia Proxy Across Wireless Internet", IEEE Global Telecommunications Conference, GLOBECOM '01, San Antonio, TX, Nov. 25-29, 2001, pp. 2009-2013.

Yin et al., "A Generalized Target-Driven Cache Replacement Policy for Mobile Environments", Proceedings of the 2003 Symposium on Applications and the Internet (SAINT '03), pp. 1-20.

Translation of Decision for Refusal for Japanese Patent Application Serial No. 2010-508966, dated Jan. 29, 2013, 6 pages.

Translation of Chinese Office Action dated Jul. 14, 2011 for co-pending Chinese Application No. 2008800124469.

European Office Action dated May 15, 2012 for co-pending European Application No. 08702706.

* cited by examiner

APPARATUS AND METHOD FOR SCREENING NEW DATA WITHOUT IMPACTING DOWNLOAD SPEED

RELATED APPLICATION

This application claims priority under 35 U.S.C. §119(e) to U.S. Provisional Application No. 60/939,861, filed May 24, 2007, which is hereby incorporated herein by reference in its entirety.

BACKGROUND

Content screening has become popular for Internet users, in order to categorize broad types of data, e.g., so as to screen out data which does not interest them. For example, a user— or a parent of a user—may want to block pornographic content from a household personal computer. Rules for screening incoming data may be based on factors such as the type of a file or on the text therein.

As content screening becomes more sophisticated, additional processing power becomes necessary to minimize the delays resulting from the screening process. In many cases, the delay incurred by screening data significantly increases the download time of files from the Internet and from other external sources, such as a compact disk (CD). The increased delay can cause problems when the time available for the download is limited. For example, a business traveler may have to forgo downloading as many files onto a laptop computer or to forgo screening the downloaded files, if only a limited time is available for Internet access between flights. Also, an office worker may want to quickly download data from the Internet onto a portable USB flash drive before rushing to a meeting in another location. The added time required for the content screening may noticeably impact the user's time available for other tasks.

It would be desirable to be able to download data quickly without compromising the standard for screening the data. However, due to the significant addition of time necessary for sophisticated screening routines to execute, it previously did not seen possible to screen incoming data without increasing the download time.

SUMMARY

The present inventor has developed devices and processes that allow data to download quickly without compromising the screening standard. The data download at regular speeds into a specially-designated non-volatile storage of a system, where the data is effectively quarantined from the system while awaiting screening to be carried out later at a more convenient time. For example, the business traveler may download files into the special storage without using additional time for screening the content. Later, at a convenient time the user may screen the data, even in a location where no connection to the Internet is available. In the meantime, there is no worry that downloaded data that does not meet the screening criteria will be accessible for use by the system (e.g., personal computer) because the downloaded data is restricted from such use (quarantined) prior to being screened.

Disclosed herein is a non-volatile storage assembly that has non-volatile storage and a screening module. The non-volatile storage is configured to store data objects received from a host and to quarantine the stored data objects from general use by the assembly pending screening, and the screening module is configured to retrieve the data objects stored in the non-volatile storage and to indicate if a data object retrieved from the non-volatile storage complies with screening criteria. A data object stored in the non-volatile storage or retrieved by the screening module is not available for use by the system other than for screening, unless the screening module has indicated that the data object complies with the screening criteria. The screening module may be further configured to delete from the non-volatile storage data objects not complying with the screening criteria. Alternatively, the screening module may be further configured to permit data objects not complying with the screening criteria to remain in the non-volatile storage.

The non-volatile storage of the non-volatile storage assembly may include a first storage device and a second storage device such that the screening module would be configured to retrieve unscreened data objects from the first storage device and to write screened data objects into the second storage device. The screened data objects written into the second storage device may be the data objects complying with the screening criteria, wherein the data objects not complying with the screening criteria are deleted. Alternatively, the screened data objects written into the second storage device may be both the data objects complying with the screening criteria and the data objects not complying with the screening criteria. As another alternative, the screening module may be configured to retrieve unscreened data objects from the first storage device, to write into the second storage device screened data objects that comply with the screening criteria, and to write into the first storage device screened data objects that do not comply with the screening criteria.

The non-volatile storage of the non-volatile storage assembly may include a single storage device configured to store both unscreened data objects and screened data objects. The screening module may change attributes of the data objects to indicate that they have been screened, and the attributes of the screened data objects may indicate whether the screened data objects comply with the screening criteria. The single storage device may have a first partition and a second partition, and the screening module would be configured to retrieve unscreened data objects from the first partition and to write screened data objects into the second partition. The screening module may be configured to write into the first partition screened data objects that do not comply with the screening criteria.

The screening module and the nonvolatile storage of the non-volatile storage assembly may reside in the host. Alternatively, the screening module may reside in the host and the non-volatile storage may be external to the host. As another alternative, the screening module and the non-volatile storage may both be external to the host. In the last case, the screening module may be configured to install a screening routine into a memory of the host, and the screening routine may be configured to retrieve the data objects stored in the non-volatile storage and to indicate which of the data objects complies with the screening criteria.

Also disclosed herein is a system for screening content that has an interface and the non-volatile storage assembly summarized above. The interface is for communicating with an external data source to receive data objects, and the non-volatile storage of the non-volatile storage assembly is configured to store the data objects received via the interface. The data object retrieved by the screening module is not available for use by the system other than screening, unless the screening module has indicated that the data object complies with the screening criteria. The interface may be a web browser, an optical disk reader, or a USB port.

Further disclosed herein is a method of authorizing content for use. The method includes receiving a data object, storing the data object in non-volatile storage, keeping the stored data object unavailable for use other than screening unless the data object has been determined to comply with the screening criteria; screening the stored data object to determine if the stored data object complies with the screening criteria, and indicating that the screened data object is available for use if the screened data object complies with the screening criteria. The operation of receiving data objects may be performed using a web browser, using an optical disk reader, and/or by obtaining the data objects through a USB port. The method may further include screening the screened data object a second time to determine if the screened data object complies with second screening criteria.

The method of authorizing content for use may include deleting from the non-volatile storage data objects that do not comply with the screening criteria. Alternatively, the method may include retaining in the non-volatile storage data objects that do not comply with the screening criteria.

The non-volatile storage for the method of authorizing content for use may include a first non-volatile storage device and a second non-volatile storage device, the data objects being stored in the first non-volatile storage device before being screened, and at least a portion of the data objects being stored in the second non-volatile storage device after being screened. The data objects stored in the second non-volatile storage device may be data objects complying with the screening criteria, and data objects not complying with the screening criteria would be deleted. Alternatively, the data objects stored in the second non-volatile storage device may be both data objects complying with the screening criteria and data objects not complying with the screening criteria. As a further alternative, the screened data objects that do not comply with the screening criteria may be stored in the first non-volatile storage device.

The non-volatile storage for the method of authorizing content for use may include a single non-volatile storage device configured to store both unscreened data objects and screened data objects. The step of indicating that a screened data object is available for use may include changing attributes of the screened data object, which attributes may be changed to indicate whether the screened data object complies with the screening criteria. The single non-volatile storage device may have a first partition and a second partition such that unscreened data objects are received from the first partition and at least a portion of screened data objects are written into the second partition.

Example embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

DETAILED DESCRIPTION

The claims below will be better understood by referring to the present detailed description of example embodiments. This description is not intended to limit the scope of claims but instead to provide examples. Described first are several example embodiments of a system that implement content screening. Then, a method is presented for authorizing content for use.

Figure 1:
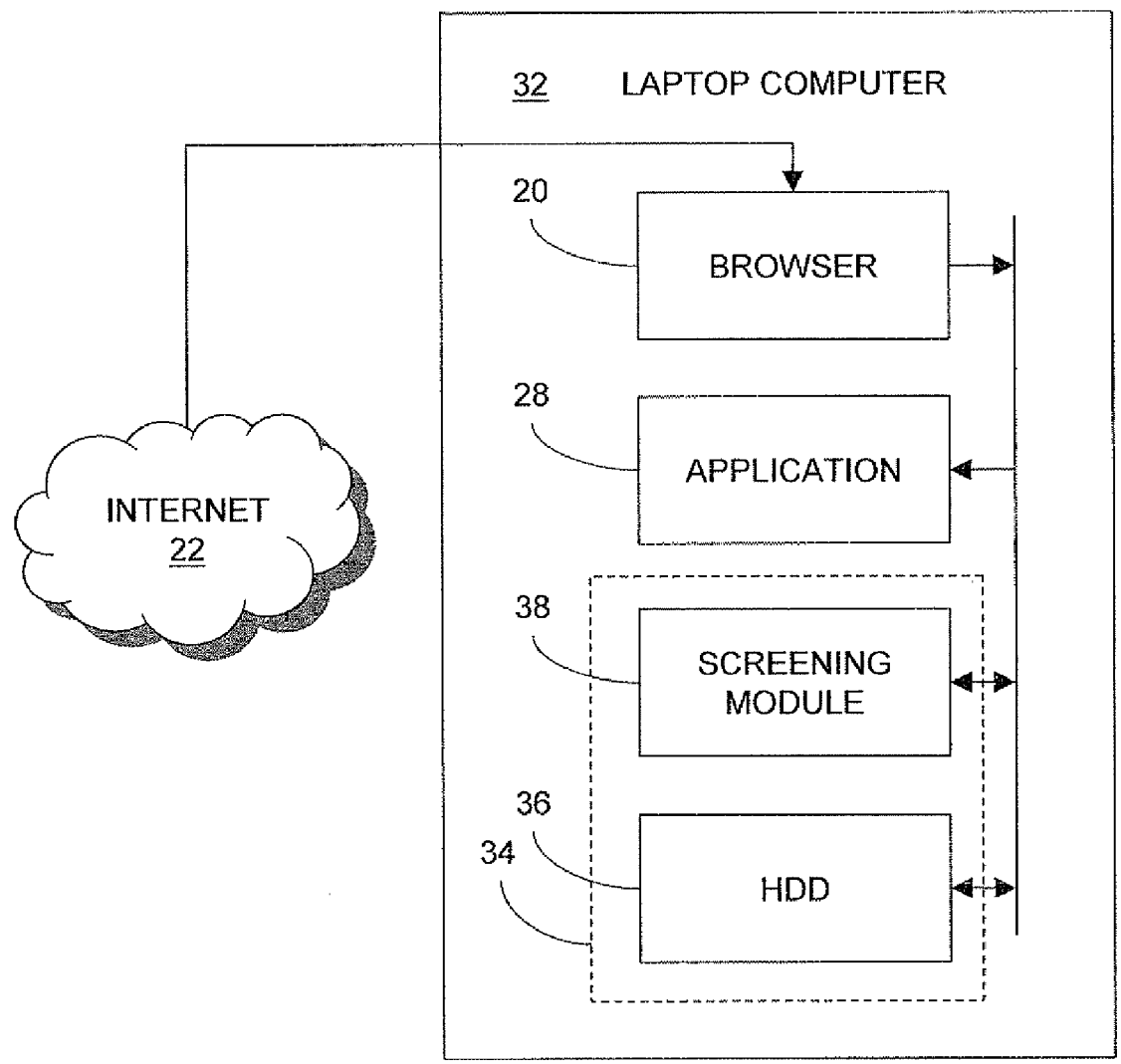
FIG. 1 illustrates a system that implements content screening in accordance with a first example embodiment, which uses a single non-volatile storage device.

FIG. 1 illustrates an example embodiment of a system for screening content. This system is implemented on, e.g., a laptop computer 32 that has a non-volatile storage assembly 34 (indicated by the dotted line) and an interface to an external data source. The interface in this embodiment is a browser 20 that communicates with the Internet 22. The browser 20 receives data objects from the Internet 22 and stores them in the non-volatile storage assembly 34. The term "data object" may reference a file, a memory page, a memory block, or other like grouping of data. As shown in the following, a data object is not available for use by the system other than screening, unless a screening module has indicated that the data object complies with established screening criteria. Data objects found to be not complying with screening criteria may be made not available for use altogether. Examples of data objects that are not available for use are those that are deleted or quarantined.

(Note that the arrows in the drawings denote the content flow relevant to the present discussion and are not intended to imply that content never can flow in the opposite direction. For example, the browser 20 can receive and send content from/to the Internet 22, even though it will generally, if not always, be the case that only the content flow from the Internet 22 to the browser 20 is relevant to the present discussion.)

The non-volatile storage assembly 34 includes a hard disk drive (HDD) 36 and a screening module 38. (Solid state memory may be used in place of an HDD or magnetic discs.) The HDD 36 is installed in the laptop computer 32, which functions as the host of the ADD 36. The laptop computer 32 receives data objects from the Internet 22 through the browser 20 and stores them on the HDD 36 without interaction with the screening module 38. Accordingly, a user having a limited time for access to the Internet may connect the laptop computer 32 to the Internet and download data objects directly to the HDD 36 without a delay caused by the screening module 38 checking whether the data objects comply with screening criteria. However, the user does not run the risk that the data might be input to an application 28, because at this time the data objects are not available for use by the system other than screening. That is, prior to being screened, the data objects stored on HDD 36 are effectively restricted from general use (quarantined) by the laptop computer 32 (e.g., from use by the application 28). Such restriction of the data objects may be performed by methods known to those of skill in the art; such methods may be implemented by any combination of software, firmware or hardware configured to perform such task. Examples are provided below regarding how to configure the storage.

The user also does not need to be concerned whether access to the Internet 22 will be available at such later time that he/she will want to screen the downloaded data objects. He/She may choose a convenient time for screening the data objects. At the time of the user's choosing, the screening module 38 retrieves the data objects stored in the HDD 36, screens them, and indicates if they comply with screening criteria. The data objects complying with the screening criteria are made available to the application 28. The screening module 38 may be configured either to delete from HDD 36 the data objects that do not comply with the screening criteria, or to retain them in HDD 36 as quarantined from general use by the laptop computer 32. The operation of making available to the remainder of laptop computer 32 (e.g. to application 28) those data objects that comply with the screening criteria may be performed by methods known to those of skill in the art; such methods may be implemented by any combination of software, firmware or hardware configured to perform such task. Examples are provided below regarding how to configure the storage, as will be appreciated by those of ordinary skill in the art.

In the example embodiment of FIG. 1, the non-volatile storage, HDD 36, is a single storage device that stores both the unscreened and the screened data objects. Alternate ways of configuring such storage are available.

For example, the screening module 38 may change attributes of the data objects to indicate that they have been screened. Screened data objects that do not comply with the screening criteria may be deleted, or they may be retained as quarantined from general use. In the latter case, the attributes of the data objects would be changed by the screening module 38 to indicate not only whether the data objects have been screened but also whether the screened data objects comply with the screening criteria.

Another example of configuring the single HDD 36 to store both the unscreened and the screened data objects is to divide the storage into multiple partitions. The unscreened data objects would be stored in one partition. The screening module 38 would retrieve the unscreened data objects, screen them, and write the screened data objects that comply with the screening criteria into a second partition. If it is desired to retain the screened data objects that do not comply with the screening criteria, those data objects may be written into the partition having the unscreened data objects, or they may be written into an additional partition.

The option of configuring the computer to retain the data objects that do not comply with the screening criteria, as noted in the example embodiments described above, may be useful for the purpose of having the downloaded content remain available for a subsequent different user who wishes to employ less restrictive or otherwise different screening criteria.

Figure 2:
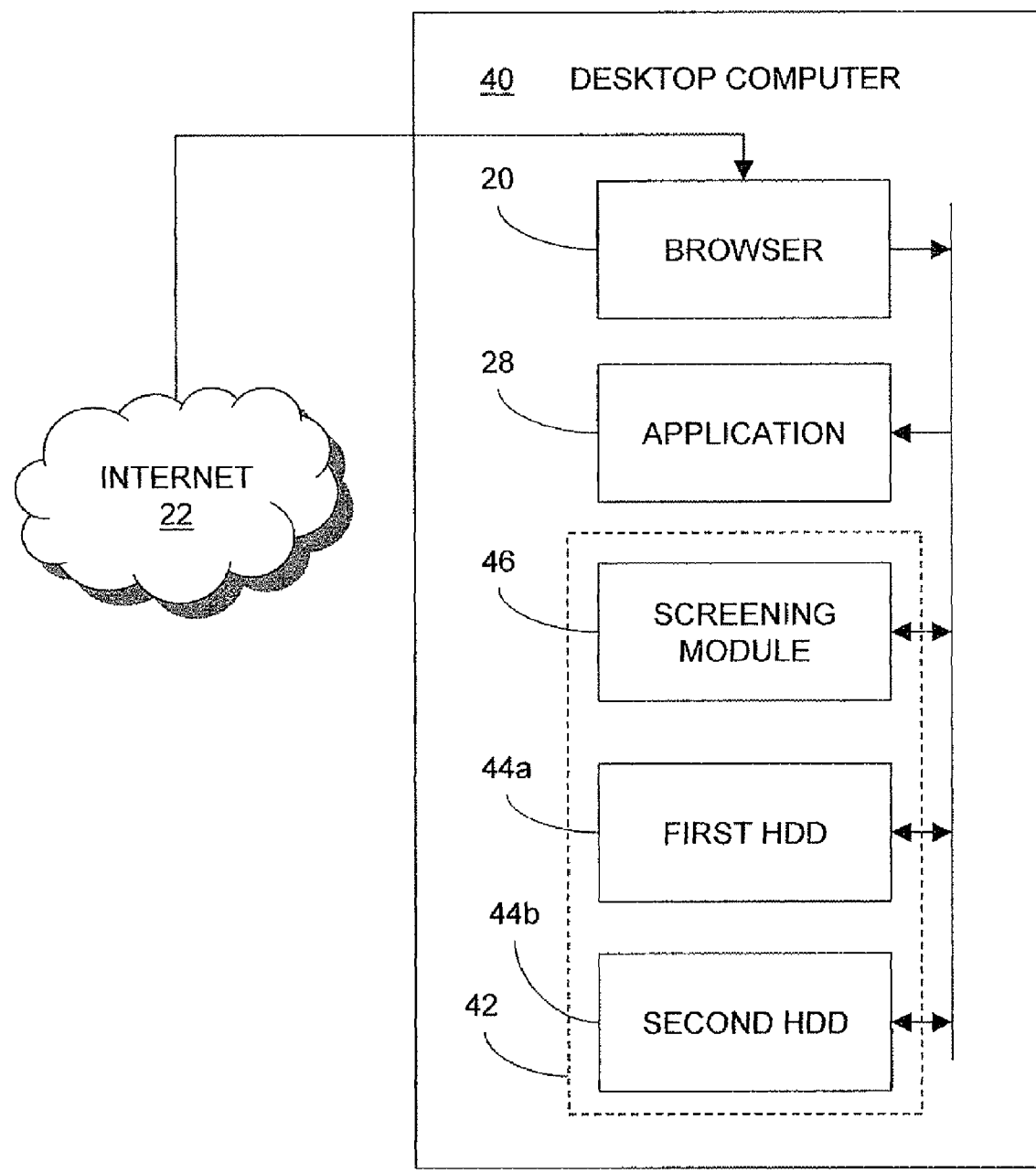
FIG. 2 illustrates a system that implements content screening in accordance with a second example embodiment, which uses two non-volatile storage devices.

FIG. 2 illustrates an alternate example embodiment of a system for screening content. In this case, the system is a desktop computer 40 that has many of the same elements as the laptop computer 32 of FIG. 1 has, as indicated by the same reference numbers. However, the desktop computer 40 has a non-volatile storage assembly 42 (indicated by the dotted line) that has two storage devices 44a and 44b and a screening module 46. Downloaded data objects are stored in the first storage device 44a before screening, and screening module 46 of the non-volatile storage assembly 42 retrieves the unscreened data objects therefrom and screens them. For data objects found to comply with the screening criteria, the screening module 46 writes them into the second storage device 44b. As for data objects found not to comply with the screening criteria, the screening module 46 may be configured, e.g., to retain them in the second storage device 44b, or to delete them. In an alternative embodiment, the screening module 46 can be configured to retain data objects that do not comply with the screening criteria in the first storage device 44a, together with the unscreened data objects. Accordingly, the second storage device 44b would be reserved only for data objects that are made available for general use by the system.

In the previously-discussed example embodiments, the screening modules and the non-volatile storages reside in the hosts. However, variations upon such configurations are within the scope of the invention.

Figure 3:
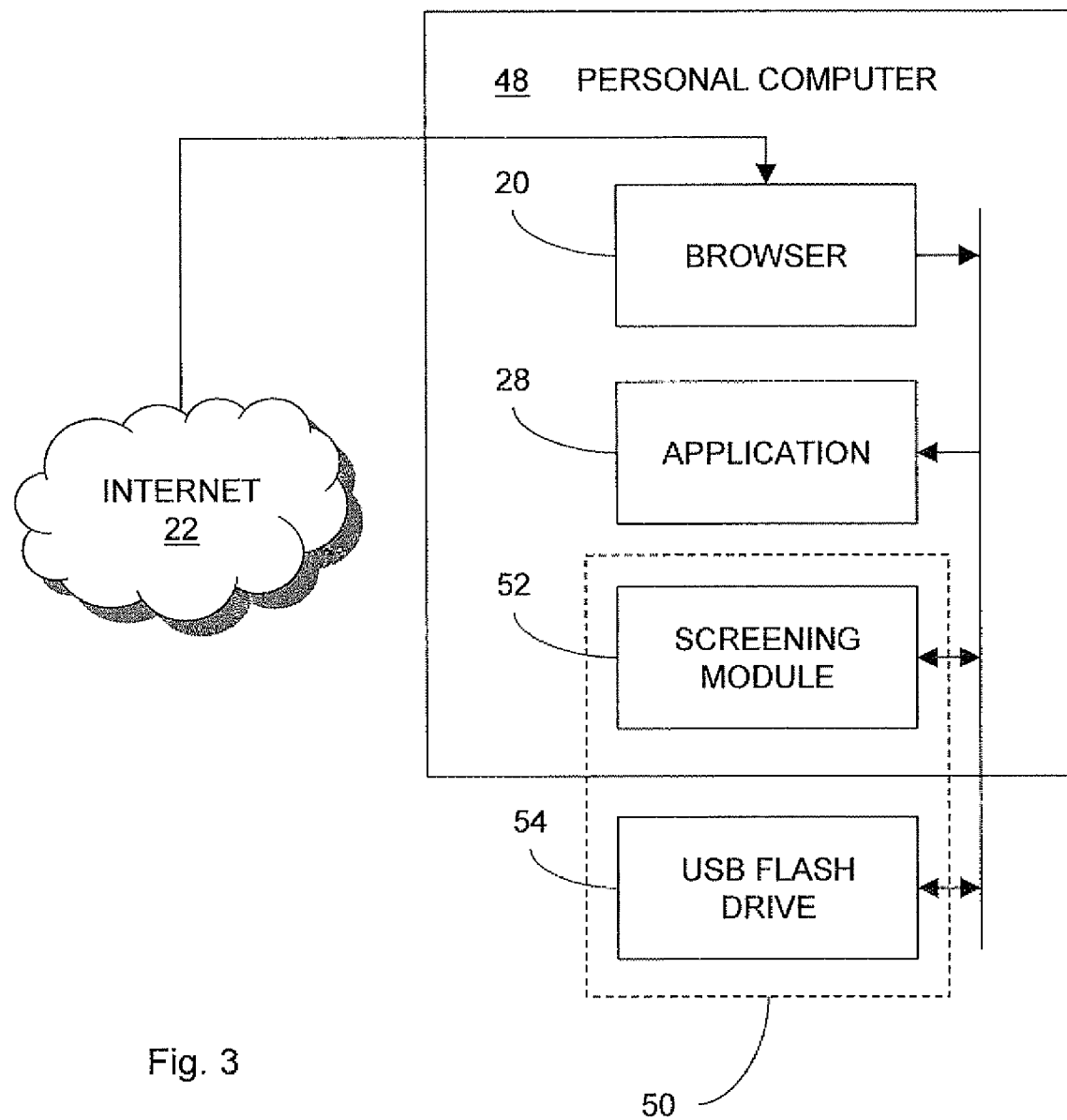
FIG. 3 illustrates a system that implements content screening in accordance with a third example embodiment, which uses a non-volatile storage device that is external to its host.

For example, FIG. 3 illustrates an example embodiment in which the screening module resides in the host and the non-volatile storage is external to the host. More specifically, the host is a personal computer 48 having a non-volatile storage assembly 50 (indicated by the dotted line) such that its screening module 52 resides in the host and a USB flash drive 54 (non-volatile storage) is external to the host. Note that, although the non-volatile storage of this example embodiment is a USB flash drive, other storage device peripherals, such as those employing NAND storage, may also be suitable.

By storing unscreened data objects on a USB flash drive, the system enables the easy transfer of unscreened data objects to different hosts, which may have screening modules that use different screening criteria. Accordingly, the USB flash drive can be configured to retain data objects that do not comply with the screening criteria of one host, because the data objects may be found to comply with the screening criteria of another host, which the user may want to use for processing the data objects. This configuration may be useful (although it is not required) for scenarios in which a user may want to use a variety of different hosts employing different screening criteria, e.g., where the user may want to select a given host/screening criteria depending on the set of data objects received, or where the user may want to screen a given set of data objects multiple times using different hosts/screening criteria.

Figure 4:
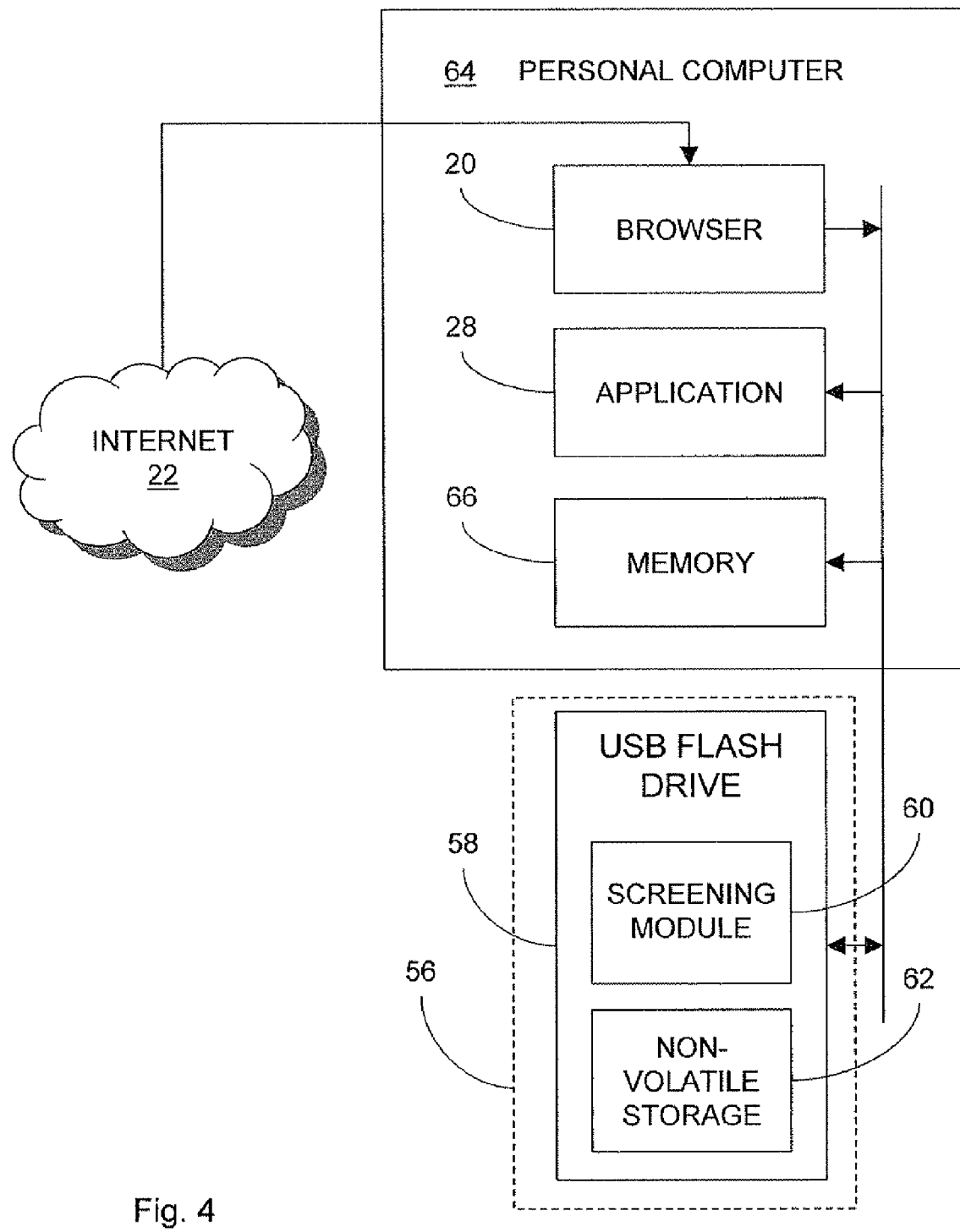
FIG. 4 illustrates a system that implements content screening in accordance with a fourth example embodiment, which uses a non-volatile storage device and a screening module that are external to their host.

In the example embodiment of FIG. 4, both the screening module and the non-volatile storage are external to the host. More specifically, the non-volatile storage assembly 56 (indicated by the dotted line) is a USB flash drive 58 that includes a screening module 60 and non-volatile storage 62. The USB flash drive 58 may be configured to screen data objects stored in non-volatile storage 62 using an internal processor, so that the data objects found to comply with screening criteria may be made available to an application 28 of a personal computer 64, which has no screening module for determining whether data objects comply with screening criteria.

Alternatively, the screening module may be configured to install a screening routine into a memory 66 of the personal computer 64. The memory 66 may, for example, be a HDD or a RAM of the system. The screening routine would then retrieve unscreened data objects from the USB flash drive 58 and determine within personal computer 64 whether individual data objects comply with screening criteria.

In the previously-discussed example embodiments, the external data source providing the system with data objects is the Internet 22, and the interface for communicating with the external data source is the web browser 20. However, variations upon this configuration are within the scope of the invention. For example, the external data source can be an optical disk, such as a CD or a DVD, or it may be USB flash drive. In such cases, the interface to the host would be an optical disk reader or a USB port, respectively.

In the example embodiments discussed herein, the screening module can be configured to delete some of the data objects that do not comply with the screening criteria and to retain the remaining non-compliant data objects. Thus, various combinations of retaining/deleting (e.g., retaining all, deleting all, retaining some and deleting some) non-compliant data objects are possible, as would be understood by one of ordinary skill in the art.

As another example embodiment of the claimed invention, a method of authorizing content for use (including a method of quarantining unauthorized (or unscreened) content) will be described with reference to flow chart 68 shown in FIG. 5. The method may execute, e.g., on a desktop or on a laptop personal computer.

The first step of the method is to receive a data object. (Step S1.) Example ways to receive a data object include operating a browser to obtain a data object from the Internet or from a local area network (LAN), operating an optical disk reader to obtain a data object from an optical disk, and/or obtaining the data object from a USB flash drive through a USB port.

The next step is to store the newly-received data object in non-volatile storage and quarantine the data object from use (i.e. keep the data object unavailable for use) by the computer other than screening. (Step S2.) Elaboration is provided below regarding how to configure and use the non-volatile storage for these steps.

The following step is to screen a data object to determine if it complies with screening criteria. (Step S3.) One way to screen the data object is access a rule file in the memory of a personal computer executing the present method or in the memory of a peripheral device connected to the personal computer. Such a rule file includes a set of screening criteria based on factors such as the type of file, the text therein, or any other aspect that can be algorithmically-recognized by software. For example, a data object could be deemed as not complying with screening criteria if it contains text that includes a specified offensive term.

If the data object complies with the screening criteria ("Yes"), the next step is to make the data object available for general use by a host and to provide an indication to that effect. (Step S4.) For example, a movie player application resident on the host would be permitted to process the data object. Elaboration is provided below of how the data object may be stored to indicate whether it is available for use. The method ends at this point.

If the data object does not comply with the screening criteria ("No"), the method also ends. However, in alternate embodiments, the method can at this point include an additional step of, e.g., deleting the non-complying data object or retaining the non-complying data object but indicating that it does not comply with the screening criteria. Elaboration of such indication is provided below.

Regarding one aspect of step S2, storing the newly-received data objects in non-volatile storage, the non-volatile storage may include two non-volatile storage devices, such as those associated with the desktop computer 40 illustrated in FIG. 2. The newly-received data objects can be restricted for storage in only one of the non-volatile storage devices. Alternatively, the non-volatile storage may be a single non-volatile storage device, such as that shown associated with the laptop computer 32 illustrated in FIG. 1. An example implementation would be to designate a specific attribute for the data objects to signify their unscreened status, which would indicate that the data objects are unavailable for use except for screening. Another example implementation would be to designate a particular partition for the newly-received data objects.

Regarding the other aspect of step S2, quarantining the stored data objects from use by the computer other than screening, as discussed above, this may be performed by methods known to those of skill in the art; such methods may be implemented by any combination of software, firmware or hardware configured to perform such task.

Regarding step S4, in making the data object available for general use by the host if the data object complies with the screening criteria and providing an indication thereof, and the corresponding step of the alternate embodiments described hereafter, either the two non-volatile storage devices of FIG. 2 or the single non-volatile storage device of FIG. 1 may be implemented. If two non-volatile storage devices are implemented, screened data objects that comply with the screening criteria would be stored in the storage device that did not have the unscreened data objects. The screened data objects that do not comply with the screening criteria can be deleted or stored with the other screened data objects, but they would need to have a designation (such as a special attribute setting) to indicate their non-compliance with the screening criteria. In an alternative embodiment, the screened data objects that do not comply with the screening criteria may be stored in the same storage device having the unscreened data objects. If a single non-volatile storage device is implemented, specific attributes for the data objects are designated to signify whether they comply with the screening criteria. In an alternate embodiment, the screened data objects are written into a special partition, which is separate from a partition for the unscreened data objects. As a further alternative, separate partitions can be designated for screened data objects that do and screened objects that do not comply with the screening criteria. The storage device (or partition) storing the screened data objects would be configured to permit all the data objects stored therein, or only the data objects stored therein and having certain attributes, as the case may be, to be available to the computer.

Figure 5:
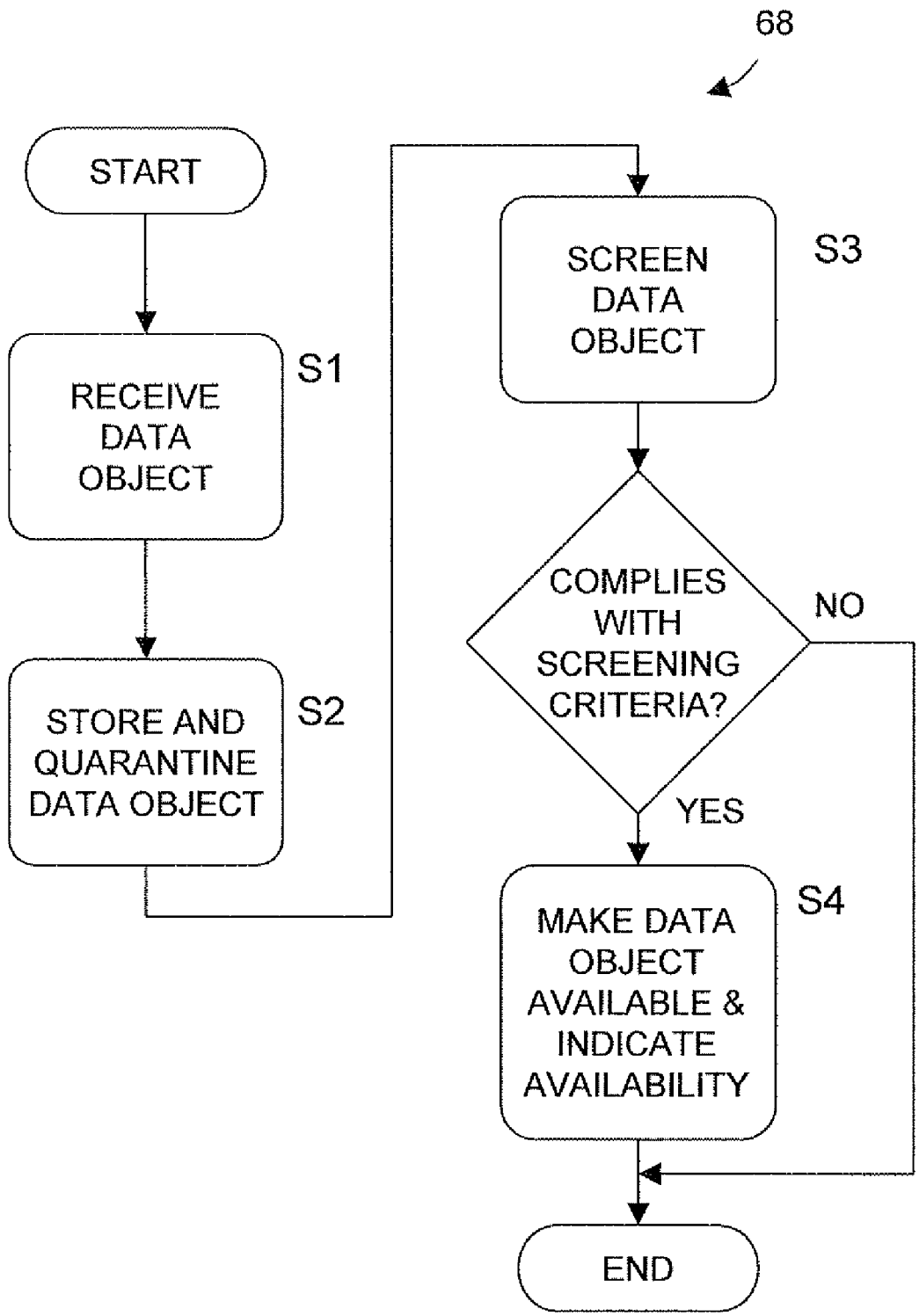
FIG. 5 presents a flow chat that represents a method of authorizing content for use in accordance with a fifth example embodiment.

An alternative to the example embodiment of FIG. 5 is to (e.g., before or after step S4) execute the additional step of screening the data object a second time to determine if it complies with different screening criteria. Such alternative would be useful in an environment (either in the household or in the workplace), e.g., in which multiple users access the same system, and the individual users do not have the same associated rule files for their screening criteria. For example, a parent may want to have access to certain content not intended for children. This additional step may also be executed by a different personal computer than that which executed the earlier steps. Accordingly, content that did not comply with the first screening criteria would still be available for another system, provided that it complies with that system's screening criteria.

Having thus described exemplary embodiments, it will be apparent that various alterations, modifications, and improvements will readily occur to those skilled in the art. Alternations, modifications, and improvements of the disclosed embodiments, though not expressly described above, are nonetheless intended and implied to be within the spirit and scope of the claims. Accordingly, the foregoing discussion is intended to be illustrative only; the invention is limited and defined only by the following claims and equivalents thereto.

I claim:

1. A non-volatile storage assembly comprising:
  non-volatile storage configured to store data objects received from a host; and
  a screening module configured to retrieve the data objects stored in the non-volatile storage at a user-determined or a predetermined time after the data objects have been stored in the non-volatile storage, and to inspect the data objects to determine if a data object retrieved from the nonvolatile storage complies with screening criteria, wherein if the data object stored in the non-volatile storage or retrieved by the screening module is determined not to comply with the screening criteria, the screening module is configured to make the data object unavailable for use by the host other than for screening;

wherein if the data object stored in the nonvolatile storage or retrieved by the screening module is determined to comply with the screening criteria, the screening module is configured to either change an attribute of the data object or move the data object to a different portion of the non-volatile storage, for access by the host, which indicates that the data object complies with the screening criteria; and wherein the non-volatile storage includes a first partition and a second partition, and wherein the screening module is configured to retrieve unscreened data objects from the first partition, and write screened data objects into the second partition.

2. The non-volatile storage assembly of claim 1, wherein the screening module is further configured to delete from the non-volatile storage data objects not complying with the screening criteria.

3. The non-volatile storage assembly of claim 1, wherein the screening module is further configured to permit data objects not complying with the screening criteria to remain in the non-volatile storage.

4. The non-volatile storage assembly of claim 1, wherein the non-volatile storage includes a first storage device and a second storage device, and wherein the screening module is configured to retrieve unscreened data objects from the first storage device and to write screened data objects into the second storage device.

5. The non-volatile storage assembly of claim 4, wherein the screened data objects written into the second storage device are data objects complying with the screening criteria, and wherein data objects not complying with the screening criteria are deleted.

6. The non-volatile storage assembly of claim 4, wherein the screened data objects written into the second storage device are both data objects complying with the screening criteria and data objects not complying with the screening criteria.

7. The non-volatile storage assembly of claim 1, wherein the non-volatile storage includes a first storage device and a second storage device, and wherein the screening module is configured to retrieve unscreened data objects from the first storage device, to write into the second storage device screened data objects that comply with the screening criteria, and to write into the first storage device screened data objects that do not comply with the screening criteria.

8. The non-volatile storage assembly of claim 1, wherein the non-volatile storage includes a single storage device configured to store both unscreened data objects and screened data objects.

9. The non-volatile storage assembly of claim 8, wherein the screening module changes attributes of the data objects to indicate that they have been screened.

10. The non-volatile storage assembly of claim 9, wherein the attributes of the screened data objects indicate whether they comply with the screening criteria.

11. The non-volatile storage assembly of claim 8, wherein the single storage device has a first partition and a second partition, and wherein the screening module is configured to retrieve unscreened data objects from the first partition and to write screened data objects into the second partition.

12. The non-volatile storage assembly of claim 8, wherein the single storage device has a first partition and a second partition, and wherein the screening module is configured to retrieve unscreened data objects from the first partition, to write into the second partition screened data objects that comply with the screening criteria, and to write into the first partition screened data objects that do not comply with the screening criteria.

13. The non-volatile storage assembly of claim 1, wherein the screening module and the non-volatile storage reside in the host.

14. The non-volatile storage assembly of claim 1, wherein the screening module and the non-volatile storage are external to the host.

15. The non-volatile storage assembly of claim 14, wherein the screening module is configured to install a screening routine into a memory of the host, and wherein the screening routine is configured to retrieve the data objects stored in the non-volatile storage and to indicate which of the data objects complies with the screening criteria.

16. A system for screening content, the system comprising:
an interface for communicating with an external data source to receive data objects;
non-volatile storage configured to store data objects received from the external data source via the interface;
a screening module configured to retrieve the data objects stored in the non-volatile storage at a user-determined or a predetermined time after the data objects have been stored in the non-volatile memory, and to inspect the data objects to determine if a data object retrieved from the nonvolatile storage complies with screening criteria, wherein if the data object stored in the nonvolatile storage or retrieved by the screening module is determined not to comply with the screening criteria, the screening module is configured to make the data object unavailable for use by the external data source other than for screening;

wherein if the data object stored in the nonvolatile storage or retrieved by the screening module is determined to comply with the screening criteria, the screening module is configured to either change an attribute of the data object or move the data object to a different portion of the non-volatile storage, for access by the external data source, which indicates that the data object complies with the screening criteria; and wherein the non-volatile storage includes a first partition and a second partition, and wherein the screening module is configured to retrieve unscreened data objects from the first partition, and write screened data objects into the second partition.

17. The non-volatile storage assembly of claim 1, wherein if the data object stored in the non-volatile storage or retrieved by the screening module is determined to comply with the screening criteria, the screening module is configured to move the data object to a different partition in the non-volatile storage or move the data object to a different non-volatile storage.

18. The system of claim 16, wherein the interface is a web browser.

19. The system of claim 17, wherein the interface is an optical disk reader.

20. The system of claim 16, wherein the interface is a USB port.

21. The system of claim 16, wherein if the data object stored in the non-volatile storage or retrieved by the screening module is determined to comply with the screening criteria, the screening module is configured to move the data object to a different partition in the non-volatile storage or move the data object to a different non-volatile storage.

22. A method of authorizing content for use, the method comprising:
   in a storage device
      receiving a data object;
      storing the data object in non-volatile storage;
      keeping the stored data object unavailable for use other than screening unless the data object has been determined to comply with the screening criteria;
      screening the stored data object at a user-determined or a predetermined time after receiving the data object, to determine if the stored data object complies with the screening criteria;
      indicating that the screened data object is available for use if the screened data object complies with the screening criteria;
      if the screened data object stored in the non-volatile storage is determined to comply with the screening criteria, either changing an attribute of the screened data object or moving the screened data object to a different portion in the non-volatile storage, so it is available for use; and
      providing the non-volatile storage with a first partition and a second partition, retrieving unscreened data objects from the first partition, and writing screened data objects into the second partition.

23. The method of claim 22, wherein the step of receiving data objects includes operating a web browser.

24. The method of claim 22, wherein the step of receiving data objects includes operating an optical disk reader.

25. The method of claim 22, wherein the step of receiving data objects includes obtaining the data objects through a USB port.

26. The method of claim 22, further comprising:
   deleting, from the non-volatile storage, data objects that do not comply with the screening criteria.

27. The method of claim 22, further comprising:
   retaining, in the non-volatile storage, data objects that do not comply with the screening criteria.

28. The method of claim 22, wherein the non-volatile storage includes a first non-volatile storage device and a second non-volatile storage device, the data objects being stored in the first non-volatile storage device before being screened, and at least a portion of the data objects being stored in the second non-volatile storage device after being screened.

29. The method of claim 28, wherein the at least a portion of the data objects stored in the second non-volatile storage device are data objects complying with the screening criteria, and wherein data objects not complying with the screening criteria are deleted.

30. The method of claim 28, wherein the at least a portion of the data objects stored in the second non-volatile storage device are both data objects complying with the screening criteria and data objects not complying with the screening criteria.

31. The method of claim 22, wherein the non-volatile storage includes a first non-volatile storage device and a second non-volatile storage device, the data objects being stored in the first non-volatile storage device before being screened, the screened data objects that comply with the screening criteria being stored in the second non-volatile storage device, and the screened data objects that do not comply with the screening criteria being stored in the first non-volatile storage device.

32. The method of claim 22, wherein the non-volatile storage includes a single non-volatile storage device configured to store both unscreened data objects and screened data objects.

33. The method of claim 32, wherein the step of indicating that the screened data object is available for use includes changing attributes of the screened data object.

34. The method of claim 33, wherein the attributes are changed to indicate whether the screened data object complies with the screening criteria.

35. The method of claim 32, wherein the single non-volatile storage device has a first partition and a second partition, and wherein unscreened data objects are received from the first partition and at least a portion of screened data objects are written into the second partition.

36. The method of claim 22 further comprising:
   screening the screened data object a second time to determine if the screened data object complies with second screening criteria.

37. The method of claim 22, wherein if the data object stored in the non-volatile storage or retrieved by the screening module is determined to comply with the screening criteria, then moving the screened data object to a different partition in the non-volatile storage or moving the screened data object to a different non-volatile storage.

* * * * *